Figure 11:
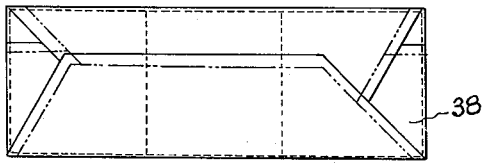

Jan. 12, 1943. C. P. DEIBEL 2,307,768
DRY CELL BATTERY UNIT
Filed Nov. 19, 1941 2 Sheets-Sheet 1
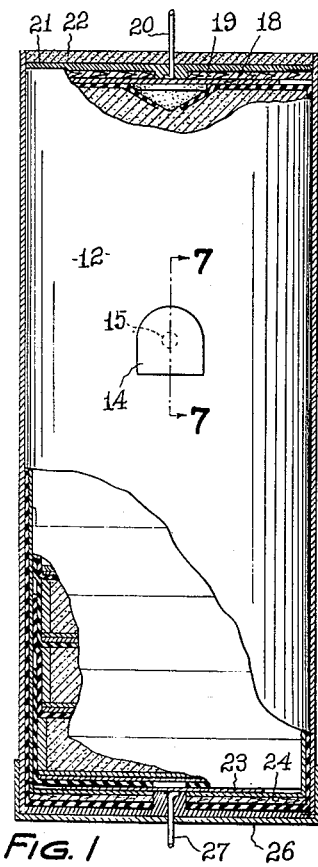
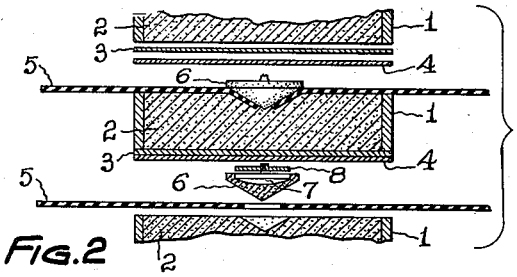
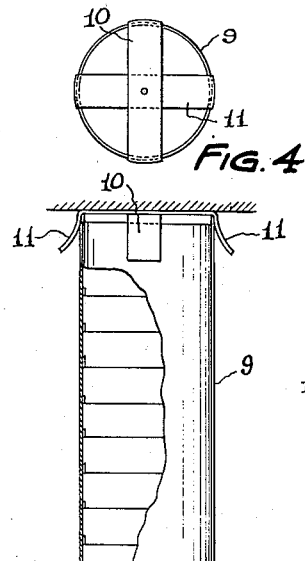
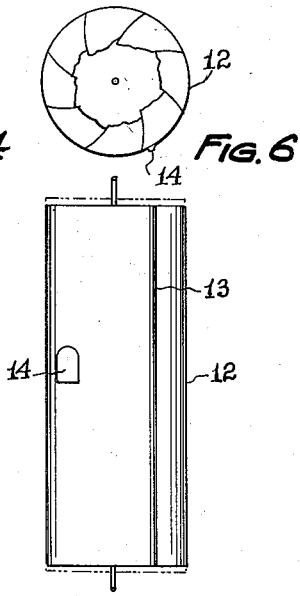
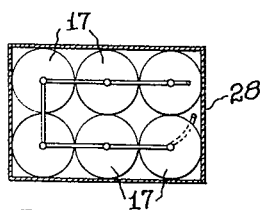
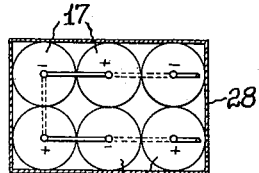
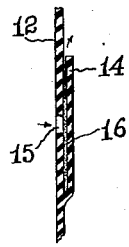
INVENTOR:
CYRIL P. DEIBEL
Ray, Macklin, Golrick,
Williams, Chilton and Isles
ATTORNEYS.

Jan. 12, 1943.    C. P. DEIBEL    2,307,768
DRY CELL BATTERY UNIT
Filed Nov. 19, 1941    2 Sheets-Sheet 2

INVENTOR:
CYRIL P. DEIBEL
BY Fay, Macklin, Gohrick,
Williams, Chilton and Isler.
ATTORNEYS.

Patented Jan. 12, 1943

2,307,768

UNITED STATES PATENT OFFICE 2,307,768

DRY CELL BATTERY UNIT

Cyril P. Deibel, Lakewood, Ohio

Application November 19, 1941, Serial No. 419,767

11 Claims. (Cl. 136—111)

This invention relates to a dry cell battery unit made up of a plurality of individual thin wafer-like cells arranged one upon the other in stacked relation and individually sealed, the entire stack of cells being secured within a suitable carton or casing which is also sealed with a thin layer of flexible material which is impervious to gases and which is provided with valve means for permitting excessive gas pressure within the battery to be relieved.

One of the objects of the invention is to provide a dry cell battery unit having the aforementioned distinguishing features and characteristics and which is light and inexpensive and well adapted for quantity production with automatic and semi-automatic machines.

Another object of the invention is to provide a dry cell battery unit of the character described which consists of a plurality of thin wafer-like dry cells arranged in stacked relation and held in contact with each other under pressure and provided with resilient means providing good electrical contact between the electrodes of adjacent cells, each cell being separately sealed and each stack of cells being further sealed by an impervious layer of flexible sealing material having therein valve means for permitting excessive gas pressure within the cell to be relieved without permitting the ingress of outside air.

Another object of the invention is to provide a dry cell battery unit of the character described in which the likelihood of leakage of electrolyte is reduced to a minimum and which contains a maximum quantity of active materials and a minimum quantity of inactive materials as well as metal.

A still further object of the invention is to provide a dry cell battery unit of the character described in which the usual outer metal casing is omitted and replaced by a paper carton, the entire unit being wrapped and sealed within a thin flexible layer of sealing material which is impervious to gases but which is provided with means for venting excessive pressure within the battery unit.

A further object of the invention is to provide a cell having the above described distinguishing features and characteristics which may be made in any particular size or shape and which may consist of any desired number of cells in order to give the voltage and capacity required.

A still further object of the invention is to provide a dry cell battery unit of the character described which consists of a plurality of thin wafer-like cells arranged in stacked relation and wrapped and sealed within a thin flexible layer of insulating material which is impervious to gases and capable of being sealed by fusion by applying heat thereto and which is not readily affected or deteriorated by oil or hydrocarbons.

Another object of the invention is to provide a dry cell battery unit which may consist of a plurality of stacks of cells arranged within an outer carton and sealed within a thin flexible layer of insulating material which is impervious to gases and which is provided with valve means for venting excessive pressure.

Figure 12:
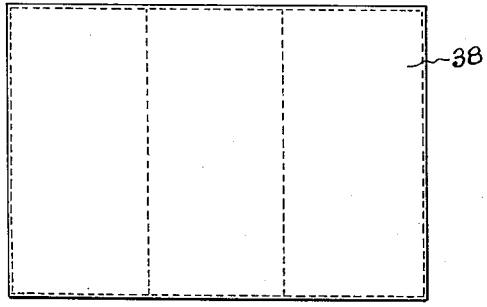
Figure 13:
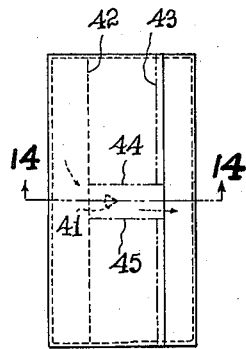
Figure 14:
Figure 15:
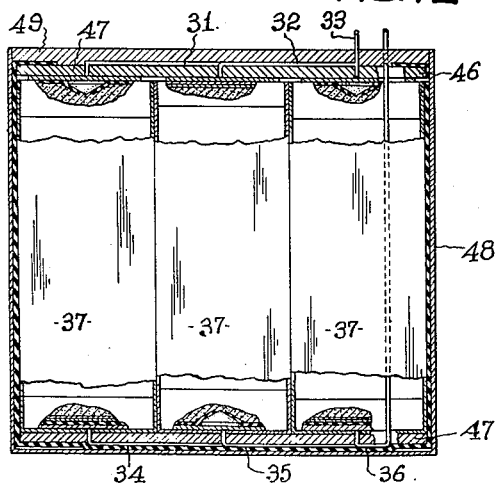

Further and more limited objects of the invention will appear as the description proceeds and by reference to the accompanying drawings in which Fig. 1 is a view partly in section and partly in elevation of a single battery unit embodying the features of my invention; Fig. 2 is a fragmentary sectional view disclosing the manner of assembling the several cells with the parts disassembled so as to more clearly disclose the construction; Fig. 3 is a view partly in elevation and partly in section disclosing the manner of securing the several cells within an outer carton; Fig. 4 is a top view of a stack of cells such as disclosed in Fig. 3; Fig. 5 is a view in side elevation of a stack of cells after they have been wrapped in the thin flexible layer of insulating material; Fig. 6 is a top view of the stack of cells of the unit shown in Fig. 5; Fig. 7 is a fragmentary sectional view taken on the line 7—7 of Fig. 1; Fig. 8 is a horizontal sectional view showing a plurality of such units arranged within a carbon and connected in parallel; Fig. 9 is a view of a similar group of cells arranged within a carton and connected in series; Fig. 10 is a fragmentary view partly in elevation and partly in section showing the universal terminal connection; Fig. 11 is a bottom plan view of the insulating jacket which encloses the battery unit; Fig. 12 is a view in side elevation of the insulating jacket shown in Fig. 11; Fig. 13 is a view in end elevation of the same insulating jacket; Fig. 14 is a sectional view taken on the line 14—14 of Fig. 13 and disclosing the venting means; and Fig. 15 is a view partly in vertical section and partly in elevation showing a plurality of stacks of cells arranged within an outer carton.

Referring now to the drawings, each cell preferably comprises an outer fish paper ring or casing 1 which contains a mass of depolarizing mix 2. Disposed over the bottom of and closing the fish paper ring is a disk of battery paper 3 and disposed over the disk of battery paper is a zinc disk 4. Extending over the top of each cell is a thin Pliofilm disk 5 which has a centrally disposed opening therein which receives a tapered carbon button 6 having a recess 7 in the upper end thereof which receives therein a thin resilient metal washer 8 having an upstanding central portion which is adapted to contact the next adjacent zinc plate. The top of the mix cake is slightly recessed to receive the carbon button 6 therein which is forced thereinto under pressure which forces the layer of Pliofilm against the mix. Each layer of Pliofilm is of such size that it overlaps the side walls of the next adjacent cell for a considerable distance as will appear from Fig. 1. In assembling the cells, the layer of Pliofilm has preferably a thin coating of adhesive such as oil or the like, so that it adheres to the side wall of the next adjacent cell. Pliofilm is hydrochlorinated rubber, that is, rubber to which hydrogen chloride has been added. It is light and thin and flexible and impervious to gases. It is strong and somewhat stretchable and tear resistant; moisture-proof and resistant to oil and grease. It also is of such a character that it can be sealed by fusing upon the application of heat thereto. Pliofilm can be purchased on the market in the form of thin transparent films or sheets. It will be seen that each individual cell is separately enclosed within a layer of Pliofilm.

A plurality of such cells are stacked one upon another and the stack is then inserted into the paper carton 9 which is slightly shorter than the stack of cells. A pair of adhesive straps 10 and 11 are then placed over the stack of cells and the stack compressed as shown in Fig. 3. The adhesive straps are then secured in place which holds the cells under pressure. The stack so formed is then placed within the Pliofilm sack 12 which is sealed along the line 13 by means of a hot roller which causes the adjacent parts to be fused together. Also applied to the Pliofilm sack is a Pliofilm flap valve 14 which is likewise fused or welded thereto. The innermost layer of Pliofilm is provided with an opening 15 which permits excessive pressure within the battery to be relieved. A thin coating of oil or other suitable adhesive 16 may be applied to the flap valve 14. This flap valve will permit excessive pressure to be vented but will prevent the ingress of outside air. The Pliofilm sack 12 is then placed within an outer paper carton or tube 17. There is then placed over the upper end of the stack of cells a terneplate washer 18 over which is received a wooden or masonite washer 19. The washers of course have openings therein of sufficient extent to permit the terminal 20 to be soldered to the terneplate. The upper end of the cell is then closed by means of a soft seal 21 and a hard seal 22. A terneplate washer 23 is then placed over the lowermost cell and then a wooden or masonite washer 24 is placed over the terneplate washer. A lower hard seal 25 is then applied and the bottom of the carton closed by a cap 26. Of course, the lowermost terminal 27 is connected with the terneplate washer before the seal and closure are applied.

The construction just described provides an air-tight carton which is impervious to gases but which is provided with valve means for permitting excessive pressure within the cell to be relieved without permitting ingress of outside air. If desired, a plurality of such battery units may be arranged within a container 28 and connected in parallel, as shown in Fig. 8, or in series, as shown in Fig. 9. In Fig. 9 each alternate cell is inverted so as to facilitate the connection of the wires. In Fig. 10 there is disclosed a universal terminal socket connection 29 which receives therein a plug 30.

The construction just described provides a dry cell battery unit made up of a plurality of thin wafer-like dry cells which are held in intimate contact with each other under compression and provided with resilient means for establishing good electrical contact between adjacent electrodes of the several cells, the entire unit being sealed within a thin flexible outer casing which is provided with valve means for venting excessive pressure without permitting the ingress of outside air and each cell is separately and individually enclosed within a thin layer of insulating material. It is of course to be understood that the cells may be made of any desired size or shape and any number of cells may be used as the exigencies of the occasion may demand.

In Figs. 11 to 15, inclusive, there is disclosed a slightly modified form of my invention in which I make use of rectangular cells instead of round cells, the construction and assembly of each cell being otherwise the same as hereinbefore described.

When it is desired to assemble a plurality of stacks of such cells into a single battery unit, for example three, the cells are arranged side by side as shown in Fig. 15, and the terminal wires connected in place. It will be noted from an inspection of Fig. 15 that each alternate cell is inverted so as to facilitate the connection of the wires. The reference characters 31, 32 and 33 designate the wires leading from the upper side of the unit. The reference characters 34, 35 and 36 designate wires which are connected with the lower terminals. The three cells which are indicated by the reference character 37 are then wrapped within a layer of Pliofilm 38 as will appear from Figs. 11, 12 and 13. The adjacent edges 39 and 40 at one end of the package overlap, as shown in Figs. 13 and 14, the innermost flap has an opening 41 therein. These flaps are then sealed and fused together along the lines 42, 43, 44 and 45 by means of a hot roller. This is to provide means for venting excessive pressure within the cell. The overlapping surfaces of the flaps 39 and 40 are preferably coated with a suitable adhesive such as oil or Vaseline which serves to prevent ingress of outside air. The Pliofilm layer is slightly longer than the cells.

A soft seal 46 is then poured over the top of the cells and the upper edge of the Pliofilm folded down thereover. The group of cells is then inverted and a hard seal 47 is poured over the opposite end of the cells. The projecting ends of the Pliofilm layer are then folded over to the position indicated in Fig. 11 and fused together by means of a hot roller. The package containing the three cells is then inserted into an outer carton or box 48 preferably formed of paper. A hard seal 49 is then poured over the top of the box to close the same. It will be noted that each alternate cell is inverted so that these three cells are connected in series. The package contains three cells each of which is individually sealed and all three of which are wrapped within a layer of Pliofilm which hermetically seals the same, the excessive pressure within the cells being relieved through the opening 41 without permitting ingress of outside air.

It will now be clear that I have provided a dry cell battery unit which will accomplish the objects of the invention as hereinbefore stated. The embodiments of the invention herein disclosed are to be considered merely as illustrative and not in a limiting sense as various changes are contemplated and may be made in the specific construction as well as in the particular materials used without departing from the spirit of my invention. The invention is therefore limited only in accordance with the scope of the appended claims.

Having thus described my invention, what I claim is:

1. A dry cell battery unit made up of a plurality of thin wafer-like dry cells arranged in stacked relation and held in contact with each other under pressure, resilient means providing good electrical contact between the electrodes of adjacent cells, each cell comprising a mass of mix, a carbon button penetrating said mix and forming an electrode and a zinc electrode and being sealed within a thin insulating cover which has sealed engagement with the next adjacent cell, each of said carbon buttons carrying said resilient means, an outer insulating cover sealing the battery unit and having therein valve means for permitting excessive pressure to be relieved without permitting the ingress of outside air.

2. A dry cell battery unit made up of a plurality of thin wafer-like dry cells arranged in stacked relation and held in contact with each other under pressure, resilient means providing good electrical contact between the electrodes of adjacent cells, each cell comprising a mass of mix, a carbon electrode and a zinc electrode and being sealed within a thin insulating cover which has sealed engagement with the next adjacent cell, an outer insulating cover wrapped around each stack of cells and hermetically sealed and having therein a single valve means for permitting excessive pressure developed in any cell to be relieved without permitting the ingress of outside air.

3. A dry cell battery unit made up of a plurality of thin wafer-like dry cells arranged in stacked relation and held in contact with each other under pressure, resilient means providing good electrical contact between the electrodes of adjacent cells, each cell comprising a mass of mix, a carbon electrode and a zinc electrode and being sealed within a thin insulating cover which has sealed engagement with the next adjacent cell, an outer insulating cover wrapped around each stack of cells and hermetically sealed and having therein an integral flap valve for permitting excessive pressure to be relieved without permitting the ingress of outside air, said outer cover being formed of a thin layer of Pliofilm or the like.

4. A dry cell battery comprising a plurality of thin wafer-like dry cells arranged in stacked relation, each cell comprising a retaining ring containing a mass of mix and a carbon electrode, a zinc disk disposed over each mass of mix, resilient washers carried by each carbon electrode providing good electrical contact between adjacent electrodes, non-metallic means holding said cells in stacked relation under pressure, a casing formed of thin insulating material wrapped around each stack of cells and hermetically sealed and having valve means for relieving excessive gas pressure.

5. A dry cell battery comprising a plurality of thin wafer-like dry cells arranged in stacked relation, each cell comprising a supporting ring containing a mass of mix and a carbon electrode, a zinc plate disposed over each mass of mix, each carbon electrode being recessed and receiving therein resilient washers providing good electrical contact with the next adjacent cell, each cell being wrapped in a thin layer of insulating material which has sealed contact with the next adjacent cell, the entire stack of cells being hermetically sealed within an envelope having valve means carried thereby for relieving excessive pressure.

6. A dry cell battery unit made of a plurality of thin wafer-like dry cells held in intimate contact with each other under pressure, resilient means providing good electrical contact between adjacent electrodes of the several cells, the entire unit being sealed within a thin flexible outer wrapper provided with a single valve means for permitting excessive pressure in any of the cells to escape from the unit without permitting the ingress of outside air, each cell being separately and individually enclosed within a thin layer of electrical insulating material having sealed overlapping contact with the next adjacent cell.

7. A dry cell battery comprising a plurality of stacks of dry cells, means holding each stack of cells under pressure, resilient means providing good electrical contact between the adjacent electrodes, each cell comprising an insulating and supporting member containing a mass of mix and a carbon electrode, a zinc electrode disposed over each mass of mix, a thin flexible layer of Pliofilm surrounding each cell and having sealed overlapping contact with the next adjacent cell, an outer thin flexible layer of Pliofilm enclosing said stack of cells and sealed by fusion to prevent leakage from said stack, said outer layer having valve means therein for relieving excessive pressure and a plurality of such units arranged within an insulating carton and provided with a terminal connection.

8. A dry cell battery unit comprising a plurality of stacks of cells, each cell comprising a supporting member containing a mass of mix and a carbon electrode and having a zinc electrode, means forming good electrical contact between the electrodes of adjacent cells, each individual cell being sealed within a thin layer of Pliofilm, said plurality of stacks of cells being contained in an outer carton, and a thin, flexible insulating jacket of Pliofilm within said carton and enclosing said plurality of stacks of cells, said jacket being provided with means for venting excessive pressure without permitting ingress of outside air.

9. A dry cell battery unit made up of a plurality of cells arranged in stacked series relation and held in contact with each other under pressure, and resilient means providing good electrical contact between the electrodes of adjacent cells, each cell comprising a mass of mix, a carbon electrode and a zinc electrode and being hermetically sealed within a thin insulating cover having the characteristics of Pliofilm and having valve means for permitting excessive pressure to be relieved without permitting the ingress of outside air, said valve means comprising an opening in said insulating cover and a flap integral with said cover for normally closing said opening.

10. A dry cell battery unit comprising a plurality of cells arranged in stacked series relation and held in series contact under pressure, means forming good electrical contact between the electrodes of adjacent cells, each individual cell being hermetically sealed within a thin layer of Pliofilm, and a flap valve integrally formed with said layer permitting excessive pressure to be relieved without permitting ingress of outside air.

11. A dry cell battery unit comprising a plurality of dry cells arranged in series stacked relation and held in contact with each other under pressure, means providing good electrical contact between the electrodes of adjacent cells, each cell being hermetically sealed in a thin flexible layer of insulating material which is impervious to gases and resistant to hydrocarbons and capable of being fused by heat, each cell having a flap valve permitting excessive pressure to be relieved but preventing the ingress of outside air, and an outer carton enclosing said stack of cells.

CYRIL P. DEIBEL.